US008855654B2

(12) United States Patent
Agarwal

(10) Patent No.: US 8,855,654 B2
(45) Date of Patent: Oct. 7, 2014

(54) METHODS, SYSTEMS, AND COMPUTER READABLE MEDIA FOR TRACKING AND COMMUNICATING LONG TERM EVOLUTION (LTE) HANDSET COMMUNICATION CAPABILITY

(71) Applicant: Tekelec Global, Inc., Morrisville, NC (US)

(72) Inventor: Devesh Agarwal, Cary, NC (US)

(73) Assignee: Tekelec Global, Inc., Morrisville, NC (US)

( * ) Notice: Subject to any disclaimer, the term of this patent is extended or adjusted under 35 U.S.C. 154(b) by 39 days.

(21) Appl. No.: 13/752,369

(22) Filed: Jan. 28, 2013

(65) Prior Publication Data
US 2014/0213265 A1 Jul. 31, 2014

(51) Int. Cl.
H04W 40/00 (2009.01)
H04W 40/02 (2009.01)

(52) U.S. Cl.
CPC .................................... H04W 40/02 (2013.01)
USPC .......................... 455/445; 455/435.1; 455/433

(58) Field of Classification Search
None
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,420,916 A | 5/1995 | Sekiguchi |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |

(Continued)

FOREIGN PATENT DOCUMENTS

| | | |
|---|---|---|
| CN | ZL200680051295.9 | 3/2013 |
| EP | 0 512 962 A2 | 11/1992 |

(Continued)

OTHER PUBLICATIONS

Communication of European publication number and information on the application of Article 67(3) EPC for European Application No. 11852129.3 (Oct. 2, 2013).

(Continued)

Primary Examiner — Erika A Washington
(74) Attorney, Agent, or Firm — Jenkins, Wilson, Taylor & Hunt, P.A.

(57) ABSTRACT

The subject matter described herein includes methods, systems and computer readable media for tracking and communicating LTE handset communication capability. One method includes maintaining, in a signaling message routing node, an LTE communication capability database. The database includes identifiers associated with LTE communication capable handsets. The method further includes, intercepting, at the signaling message routing node, a request for routing information. The method further includes, determining, by the signaling message routing node using the LTE communication capability database, whether a B party number associated with the request for routing information is associated with an LTE communication capable handset. In response to determining that the B party number is associated with an LTE communication capable handset, the method includes, responding, by the routing node, to the request for routing information with an identifier for a node in an LTE network for providing LTE service to the LTE capable handset.

27 Claims, 8 Drawing Sheets

(56) References Cited

U.S. PATENT DOCUMENTS

| | | |
|---|---|---|
| 5,455,855 A | 10/1995 | Hokari |
| 5,457,736 A | 10/1995 | Cain et al. |
| 5,475,732 A | 12/1995 | Pester, III |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,812,639 A | 9/1998 | Bartholomew et al. |
| 5,819,178 A | 10/1998 | Cropper |
| 5,822,694 A | 10/1998 | Coombes et al. |
| 5,832,382 A | 11/1998 | Alperovich |
| 5,841,854 A | 11/1998 | Schumacher et al. |
| 5,852,660 A | 12/1998 | Lindquist et al. |
| 5,854,982 A | 12/1998 | Chambers et al. |
| 5,862,481 A | 1/1999 | Kulkarni et al. |
| 5,867,788 A | 2/1999 | Joensuu |
| 5,878,347 A | 3/1999 | Joensuu et al. |
| 5,878,348 A | 3/1999 | Foti |
| 5,889,849 A | 3/1999 | Ban et al. |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,094,578 A | 7/2000 | Purcell et al. |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,134,441 A | 10/2000 | Åström et al. |
| 6,137,806 A | 10/2000 | Martinez |
| 6,138,007 A | 10/2000 | Bharatia |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,175,743 B1 | 1/2001 | Alperovich et al. |
| 6,178,181 B1 | 1/2001 | Glitho |
| 6,192,242 B1 | 2/2001 | Rollender |
| 6,205,210 B1 | 3/2001 | Rainey et al. |
| 6,208,870 B1 | 3/2001 | Lorello et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,292,669 B1 | 9/2001 | Meuronen et al. |
| 6,298,232 B1 | 10/2001 | Marin et al. |
| 6,308,075 B1 | 10/2001 | Irten et al. |
| 6,324,279 B1 | 11/2001 | Kalmanek et al. |
| 6,327,350 B1 | 12/2001 | Spangler et al. |
| 6,338,140 B1 | 1/2002 | Owens et al. |
| 6,356,529 B1 | 3/2002 | Zarom |
| 6,363,431 B1 | 3/2002 | Hammer et al. |
| 6,377,674 B1 | 4/2002 | Chong et al. |
| 6,377,807 B1 | 4/2002 | Iparrea et al. |
| 6,411,632 B2 | 6/2002 | Lindgren et al. |
| 6,421,674 B1 | 7/2002 | Yoakum et al. |
| 6,424,832 B1 | 7/2002 | Britt et al. |
| 6,434,127 B1 | 8/2002 | Ha |
| 6,453,174 B1 | 9/2002 | Cunningham et al. |
| 6,463,055 B1 | 10/2002 | Lupien et al. |
| 6,493,551 B1 | 12/2002 | Wang et al. |
| 6,505,048 B1 | 1/2003 | Moles et al. |
| 6,512,926 B1 | 1/2003 | Henry-Labordere |
| 6,515,997 B1 | 2/2003 | Feltner et al. |
| 6,519,242 B1 | 2/2003 | Emery et al. |
| 6,519,468 B1 | 2/2003 | Donovan et al. |
| 6,529,524 B1 | 3/2003 | Liao et al. |
| 6,535,746 B1 | 3/2003 | Yu et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,615,037 B1 | 9/2003 | Bharatia et al. |
| 6,625,461 B1 | 9/2003 | Bertacchi |
| 6,643,511 B1 | 11/2003 | Hu et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,697,620 B1 | 2/2004 | Lamb et al. |
| 6,731,926 B1 | 5/2004 | Link, II et al. |
| 6,738,636 B2 | 5/2004 | Lielbriedis |
| 6,745,041 B2 | 6/2004 | Allison et al. |
| 6,795,701 B1 | 9/2004 | Baker et al. |
| 6,801,781 B1 | 10/2004 | Provost et al. |
| 6,819,932 B2 | 11/2004 | Allison et al. |
| 6,826,397 B1 | 11/2004 | Vasa |
| 6,836,477 B1 | 12/2004 | West, Jr. et al. |
| 6,850,768 B2 | 2/2005 | Foll |
| 6,865,191 B1 | 3/2005 | Bengtsson et al. |
| 6,885,872 B2 | 4/2005 | McCann et al. |
| 6,912,389 B2 | 6/2005 | Bright et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,035,239 B2 | 4/2006 | McCann et al. |
| 7,039,037 B2 | 5/2006 | Wang et al. |
| 7,043,002 B2 | 5/2006 | Delaney et al. |
| 7,079,524 B2 | 7/2006 | Bantukul et al. |
| 7,079,853 B2 | 7/2006 | Rathnasabapathy et al. |
| 7,092,505 B2 | 8/2006 | Allison et al. |
| 7,113,800 B2 | 9/2006 | Linkola |
| 7,145,875 B2 | 12/2006 | Allison et al. |
| 7,181,194 B2 | 2/2007 | McCann et al. |
| 7,190,959 B2 | 3/2007 | Palmer et al. |
| 7,221,952 B2 | 5/2007 | Cho et al. |
| 7,257,401 B1 | 8/2007 | Dizdarevic et al. |
| 7,274,683 B2 | 9/2007 | Segal |
| 7,286,839 B2 | 10/2007 | McCann et al. |
| 7,397,773 B2 | 7/2008 | Qu et al. |
| 7,551,608 B1 | 6/2009 | Roy |
| 7,729,485 B2 | 6/2010 | Koskinen et al. |
| 7,746,864 B1 | 6/2010 | Asawa et al. |
| 7,848,767 B2 | 12/2010 | McCann et al. |
| 7,889,716 B2 | 2/2011 | Tejani et al. |
| 7,916,857 B2 | 3/2011 | Palmer et al. |
| 2001/0006897 A1 | 7/2001 | Kang et al. |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0046856 A1 | 11/2001 | McCann |
| 2002/0132636 A1 | 9/2002 | Stockhusen |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2003/0003930 A1 | 1/2003 | Allison et al. |
| 2003/0007482 A1 | 1/2003 | Khello et al. |
| 2003/0016684 A1 | 1/2003 | Prasad et al. |
| 2003/0026289 A1 | 2/2003 | Mukherjee et al. |
| 2003/0054844 A1 | 3/2003 | Anvekar et al. |
| 2003/0061234 A1 | 3/2003 | Ali et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0157938 A1 | 8/2003 | Haase et al. |
| 2003/0193967 A1 | 10/2003 | Fenton et al. |
| 2003/0227899 A1 | 12/2003 | McCann |
| 2004/0076126 A1 | 4/2004 | Qu et al. |
| 2004/0081206 A1 | 4/2004 | Allison et al. |
| 2004/0082332 A1 | 4/2004 | McCann et al. |

(56) References Cited

U.S. PATENT DOCUMENTS

| | | | |
|---|---|---|---|
| 2004/0087300 A1 | 5/2004 | Lewis | |
| 2004/0125925 A1 | 7/2004 | Marsot | |
| 2004/0142707 A1 | 7/2004 | Midkiff et al. | |
| 2004/0198351 A1 | 10/2004 | Knotts | |
| 2004/0202187 A1 | 10/2004 | Kelly et al. | |
| 2004/0203914 A1 | 10/2004 | Kall et al. | |
| 2004/0219935 A1 | 11/2004 | McCann et al. | |
| 2004/0246965 A1 | 12/2004 | Westman et al. | |
| 2004/0264674 A1 | 12/2004 | Delaney et al. | |
| 2005/0003838 A1 | 1/2005 | McCann et al. | |
| 2005/0111641 A1 | 5/2005 | Koskinen et al. | |
| 2005/0119017 A1 | 6/2005 | Lovell et al. | |
| 2005/0238048 A1 | 10/2005 | Delaney et al. | |
| 2006/0034256 A1 | 2/2006 | Addagatla et al. | |
| 2006/0067338 A1 | 3/2006 | Hua et al. | |
| 2006/0098621 A1 | 5/2006 | Plata et al. | |
| 2006/0136557 A1 | 6/2006 | Schaedler et al. | |
| 2006/0281492 A1 | 12/2006 | Jiang | |
| 2007/0061397 A1 | 3/2007 | Gregorat et al. | |
| 2007/0066326 A1 | 3/2007 | Agarwal et al. | |
| 2007/0104184 A1 | 5/2007 | Ku et al. | |
| 2007/0207802 A1 | 9/2007 | Palmer et al. | |
| 2007/0254681 A1 | 11/2007 | Horvath et al. | |
| 2007/0258575 A1 | 11/2007 | Douglas et al. | |
| 2007/0288655 A1 | 12/2007 | Price et al. | |
| 2007/0297419 A1 | 12/2007 | Askerup et al. | |
| 2008/0039104 A1 | 2/2008 | Gu et al. | |
| 2008/0233931 A1 | 9/2008 | Shim | |
| 2008/0248820 A1 | 10/2008 | Lohtia | |
| 2009/0003388 A1 | 1/2009 | Florkey et al. | |
| 2009/0227276 A1 | 9/2009 | Agarwal et al. | |
| 2009/0232011 A1 | 9/2009 | Li et al. | |
| 2010/0113016 A1 | 5/2010 | Gayde et al. | |
| 2010/0217858 A1 | 8/2010 | Przybysz et al. | |
| 2010/0250662 A1 | 9/2010 | Agarwal et al. | |
| 2010/0331023 A1* | 12/2010 | Cai et al. | 455/466 |
| 2011/0222532 A1 | 9/2011 | Noldus | |
| 2012/0034900 A1 | 2/2012 | Agarwal | |
| 2012/0163297 A1 | 6/2012 | Agarwal et al. | |
| 2012/0202550 A1 | 8/2012 | Marsico | |
| 2012/0224524 A1 | 9/2012 | Marsico | |
| 2012/0224563 A1* | 9/2012 | Zisimopoulos et al. | 370/331 |
| 2012/0287844 A1 | 11/2012 | Ophir et al. | |
| 2013/0157620 A1 | 6/2013 | Marsico | |

FOREIGN PATENT DOCUMENTS

| | | |
|---|---|---|
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 01/47297 A2 | 6/2001 |
| WO | WO 01/48984 A1 | 7/2001 |
| WO | WO 01/54444 A1 | 7/2001 |
| WO | WO 02/060192 A2 | 8/2002 |
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/008786 A1 | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/095379 A2 | 8/2007 |
| WO | WO 2007/146257 A2 | 12/2007 |
| WO | WO 2008/157213 A2 | 12/2008 |
| WO | WO 2009/023573 A2 | 2/2009 |
| WO | WO 2010/111561 A2 | 9/2010 |
| WO | WO 2012/088497 A1 | 6/2012 |

OTHER PUBLICATIONS

Applicant-Initiated Interview Summary for U.S. Appl. No. 12/732,178 (Sep. 26, 2013).

Notice of Allowance and Fee(s) Due for U.S. Appl. No. 13/336,132 (Sep. 23, 2013).

Second Examination Report for Indian Application No. 3231/CHENP/2008 (Aug. 6, 2013).

Final Office Action for U.S. Appl. No. 12/732,178 (Jun. 17, 2013).

Notice of Allowance and Fee(s) Due for U.S. Appl. No. 13/336,132 (May 20, 2013).

First Examination Report for Indian Application No. 3231/CHENP/2008 (Jan. 2, 2013).

Non-Final Office Action for U.S. Appl. No. 13/336,132 (Dec. 18, 2012).

Commonly-assigned, co-pending U.S. Appl. No. 13/714,360 for "Methods, Systems, and Computer Readable Media for Seamless Roaming Between Diameter and Non-Diameter Networks," (Unpublished, filed Dec. 13, 2012).

Non-Final Office Action for U.S. Appl. No. 12/732,178 (Nov. 6, 2012).

Notification of Transmittal of the International Search Report and the Written Opinion of the International Searching Authority, or the Declaration for International Application No. PCT/US2011/067130 (Jun. 7, 2012).

U.S. Appl. No. 61/576,213 for "LTE HSS with HLR Proxy Mode for Mobility" (Unpublished, filed Dec. 15, 2011).

Communication under Rule 71(3) EPC for European Application No. 06 844 747.3 (Jul. 19, 2011).

Chinese Official Action for Chinese Patent Application No. 200680051295.9 (Dec. 24, 2010).

Notification of Transmittal of the International Search Report and the Written Opinion of the International Searching Authority, or the Declaration for International Application No. PCT/US2010/028762 (Oct. 27, 2010).

Notice of Allowance and Fee(s) Due for U.S. Appl. No. 11/291,502 (Oct. 5, 2010).

Notice of Allowance and Fee(s) Due for U.S. Appl. No. 10/405,859 (Aug. 5, 2010).

U.S. Appl. No. 61/291,961 for "A GTP Relay for Direct Internet Access from the Roaming Mobile Network and Other Services," (Unpublished, filed Jan. 4, 2010).

Notice of Allowance and Fee(s) Due for U.S. Appl. No. 11/706,837 (May 27, 2010).

Communication Pursuant to Article 94(3) EPC for European Application No. 06844747.3 (May 11, 2010).

Notice of Allowance and Fee(s) Due for U.S. Appl. No. 10/405,859 (Mar. 9, 2010).

Final Official Action for U.S. Appl. No. 11/291,502 (Feb. 4, 2010).

"Diameter (Protocol)," Wikipedia, pp. 1-8 (Document last modified on Jan. 16, 2010).

Final Official Action for U.S. Appl. No. 11/706,837 (Dec. 15, 2009).

Korhonen et al., "Clarifications on the Routing of Diameter Requests Based on the Username and the Realm," RFC 5729, pp. 1-12 (Dec. 2009).

Interview Summary for U.S. Appl. No. 11/706,837 (Oct. 26, 2009).

Korhonen et al., "Diameter User-Name and Realm Based Request Routing Clarifications," draft-ietf-dime-nai-routing-04.txt, pp. 1-13 (Oct. 6, 2009).

Official Action for U.S. Appl. No. 10/405,859 (Aug. 3, 2009).

Communication pursuant to Article 94(3) EPC for European application No. 06844747.3 (Jul. 28, 2009).

Official Action for U.S. Appl. No. 11/706,837 (May 13, 2009).

(56) References Cited

OTHER PUBLICATIONS

Official Action for U.S. Appl. No. 11/291,502 (May 13, 2009).
Supplementary European Search Report for European Application No. 06844747.3 (Apr. 24, 2009).
Final Official Action for U.S. Appl. No. 10/405,859 (Jan. 6, 2009).
3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8 4.0 (Jan. 2009).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Interview Summary for U.S. Appl. No. 10/405,859 (Aug. 20, 2008).
Official Action for U.S. Appl. No. 11/706,837 (Jul. 29, 2008).
Communication of European publication number and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/04175 (Jul. 22, 2008).
Official Action for U.S. Appl. No. 10/405,859 (Mar. 17, 2008).
Restriction Requirement for U.S. Appl. No. 10/405,859 (Feb. 6, 2008).
"3rd Generation Partnership Project; Technical Specifications Group Service and System Aspects; Telecommunication management; Charging management; Diameter charging applications (Release 7)," 3GPP TS 32.299, V7.7.0, pp. 1-120 (Sep. 2007).
"IP Multimedia Subsystem," printout from wikipedia.org, Wikimedia Foundation, Inc. (May 29, 2007).
Supplementary European Search Report for European application No. 04 756 094.1 (Mar. 29, 2007).
"HP OpenCall Home Subscriber Server Software—Data Sheet", 4AA0-3360ENW Rev. 2, Hewlett-Packard Development Company, L.P. (Jul. 2006).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
International Search Report in PCT Application No. 03/32626 (Mar. 5, 2004).
"A Study in Mobile Messaging: The Evolution of Messaging in Mobile Networks, and How to Efficiently and Effectively Manage the Growing Messaging Traffic," White Paper, Cisco Systems, Inc., pp, 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Calhoun et al., "Diameter Base Protcol," Network Working Group, RFC 3588 (Sep. 2003).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).

"Cisco IP Transfer Point Multilayer Short Message Service Routing Solution," Cisco Systems, Inc., pp. 1-6 (Copyright 1992-2003).
"Cisco ITP Map Gateway for Public WLAN Slm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Bertrand, "Jambala Mobility Gateway-Convergence and Inter-System Roaming," Ericsson Review, p. 89-93 (1999).
"Topsail Beach—SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al. "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for No. Portability," AT&T Network Systems, No. 1, p. 1-75, (Feb. 2, 1996).
ETSI, Digital Cellular Telecommunications System (Phase 2+); Mobile Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).

(56) References Cited

OTHER PUBLICATIONS

Telcordia Technologies, "CCS Network interface Specification (CCSNIS) Supporting SCCP and TCAP," Bell Communications Research, p. ii-xii, 1-1-C-22, (Mar. 1994).

Buckles, "Very High Capacity Signaling Trnsfer Point for Intelligent Network Servcies," DSC Communciations Corporation, p. 1308-1311, (1988).

"Diameter Overview," referenced from www.ulticom.com/html/products/signalware-diameter-reference-guide.asp (Publication date unknown).

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)M1310, pp. 49-62 (Publication Date Unknown).

\* cited by examiner

METHODS, SYSTEMS, AND COMPUTER READABLE MEDIA FOR TRACKING AND COMMUNICATING LONG TERM EVOLUTION (LTE) HANDSET COMMUNICATION CAPABILITY

TECHNICAL FIELD

The subject matter described herein relates to providing services to mobile handsets with LTE communication capability. More particularly, the subject matter described herein relates to methods, systems and computer readable media for tracking and communicating LTE handset communication capability.

BACKGROUND

LTE or long term evolution is a family of mobile communications network protocols characterized by higher data rates and improved quality of service to mobile handsets. Mobile network operators are currently in the process of deploying LTE equipment in their networks. However, not all subscribers in a mobile network operator's network have LTE-capable handsets. For example, some subscribers may have non-LTE handsets and other subscribers may have handsets capable of both LTE and non-LTE communications. Other subscribers may have LTE-only handsets.

Mobile network operators know which of their subscribers have LTE capable handsets and in which network type a mobile handset is currently registered. It is desirable to route communications to LTE capable handsets via the LTE network to provide the best possible service to a mobile network operator's subscribers.

Accordingly, there exists a need for methods, systems, and computer readable media for tracking and communicating LTE handset communication capability.

SUMMARY

The subject matter described herein includes methods, systems and computer readable media for tracking and communicating LTE handset communication capability. One method includes maintaining, in a signaling message routing node, an LTE communication capability database. The database includes identifiers associated with LTE communication capable handsets. The method further includes, intercepting, at the signaling message routing node, a request for routing information. The method further includes, determining, by the signaling message routing node using the LTE communication capability database, whether a B party number associated with the request for routing information is associated with an LTE communication capable handset. In response to determining that the B party number is associated with an LTE communication capable handset, the method includes, responding, by the routing node, to the request for routing information with an identifier for a node in an LTE network for providing LTE service to the LTE capable handset.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
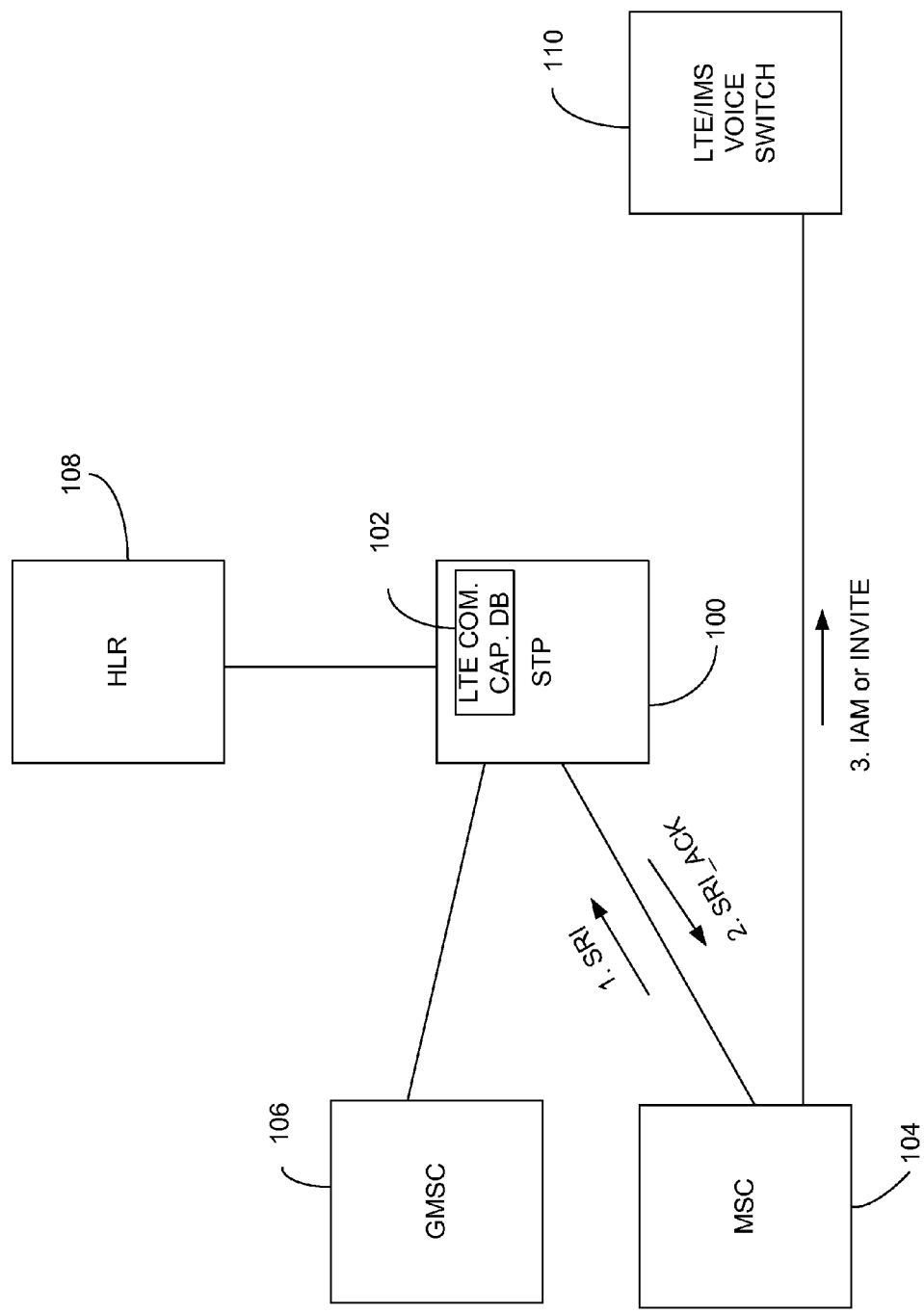
FIG. 1 is a network diagram illustrating an exemplary system for tracking and communicating LTE handset communication capability according to an embodiment of the subject matter described herein.

The subject matter described herein includes methods, systems, and computer readable media for tracking and communicating LTE handset communication capability. According to one aspect of the subject matter described herein, a signaling message routing node, such as a signal transfer point, maintains an LTE communication capability database that stores identifiers for LTE communications capable handsets. FIG. 1 is a network diagram illustrating a signaling message routing node that includes an LTE communication capability database according to an embodiment of the subject matter described herein. Referring to FIG. 1, routing node 100 includes LTE communication capability database 102. Routing node 100 may be a signal transfer point (STP), a SIP routing node, a Diameter routing node or any combination thereof for routing SS7, SIP, Diameter, and other types of signaling messages between network nodes. LTE communication capability database 102 may contain or be indexed by mobile subscriber identifiers, such as mobile subscriber integrated services digital network (MSISDN) numbers or international mobile station identifiers (IMSIs) and may indicate whether or not a handset is LTE communication capable. In one example, database 102 may contain only mobile subscriber identifiers for LTE communication capable handsets, and thus the presence of a mobile subscriber identifier in the database may indicate LTE communication capability. In another example, database 102 may contain or be indexed by mobile subscriber identifiers and may further contain indicators separate from the mobile subscriber identifiers that indicate whether or not handsets are LTE communications capable.

In the example illustrated in FIG. 1, routing node 100 routes messages between mobile switching center 104, gateway mobile switching center 106 and HLR 108. In one deployment scenario, routing node 100 may be located in the 3G network and may route registration and other types of messages to and from HLR 108. Signaling message routing node 100 may also intercept requests for routing information and access database 102 to determine whether the B party number (i.e., the called party number or destination party number) in a routing request message corresponds to an LTE capable handset. In response to determining that the B party number corresponds to an LTE capable handset, routing node 100 may respond on behalf of HLR 108. The response may include routing information for a node in the LTE network, such as LTE/IMS voice switch 110, that is configured to provide LTE service to the mobile device. LTE/IMS voice switch 110 may be an IMS CSCF, a softswitch, or other IMS voice switch.

Referring to the message flow illustrated in FIG. 1, in step 1, MSC 104 sends a send routing information (SRI) message to HLR 108. The SRI message may be generated in response to an attempt to route a call to the B party number identified in the SRI message. Upon receiving the SRI message, rather than simply routing the message, routing node 100 examines the B party number in the SRI message and determines whether LTE communication capability database 102 indicates that the B party number corresponds to an LTE capable handset. In response to determining that the B party number corresponds to an LTE capable handset, in step 2, signaling message routing node 100 sends an SRI_Ack message that contains an identifier for a node that is capable of providing LTE service to the LTE-capable handset. In the illustrated example, that node is LTE/IMS voice switch 110. In step 3, MSC 104 routes the call to LTE/IMS voice switch 110 by sending an ISUP IAM message or a SIP invite message to LTE/IMS voice switch 110. In one implementation, LTE/IMS voice switch 110 may simultaneously page the handset in both the 3G and the LTE networks. If the handset is currently registered in the 3G network, the call will be routed to the 3G network. However, if the handset is registered in the LTE network, the call will be routed to the handset via the LTE network.

Figure 2:
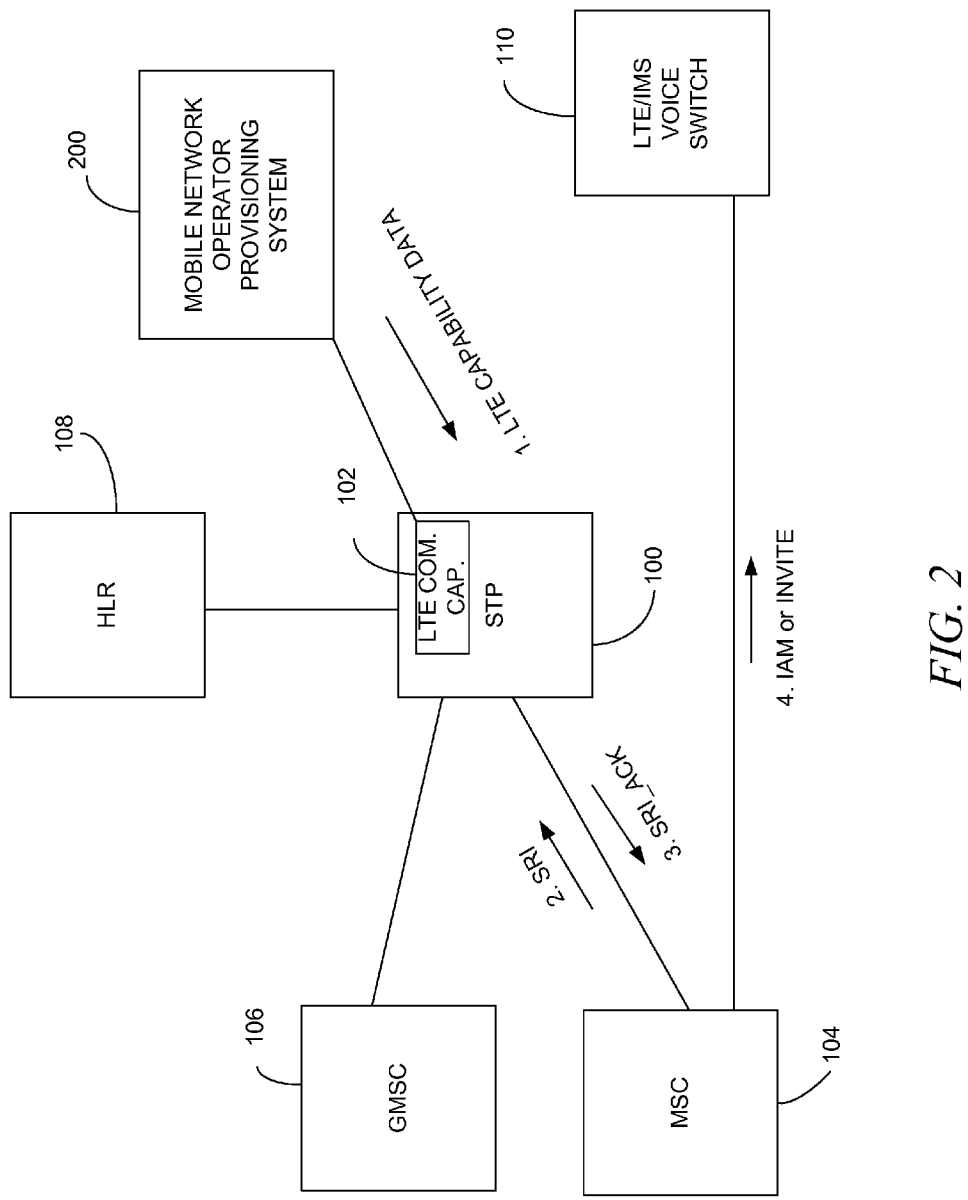
FIG. 2 is a network diagram illustrating one method for provisioning an LTE communication capability database at a signaling message routing node according to an embodiment of the subject matter described herein.

FIG. 2 is a network diagram illustrating one method for provisioning LTE communication capability database 102. In FIG. 2, a mobile network operator provisioning system 200 provisions database 102 with LTE communication capability data. The data may be updated by provisioning system 200 as new LTE communication capable handsets are issued to subscribers. Provisioning system 200 may also update database 102 as subscriber handsets are removed or replaced.

Referring to the message flow illustrated in FIG. 2, in step 1, provisioning system 200 populates database 102 with LTE communication capability data. As stated above, the LTE communication capability data may include a list of mobile subscriber identifiers for handsets that have LTE communication capabilities. Database 102 may be provisioned via any suitable interface, such as a structured query language (SQL) interface or other database interface. In step 2, routing node 100 receives a SRI message from MSC 104. In step 3, routing node 100 accesses database 102 and responds to the SRI message with routing information for LTE/IMS voice switch 110. In step 4, MSC 104 routes the call to LTE/IMS voice switch 110.

Figure 3:
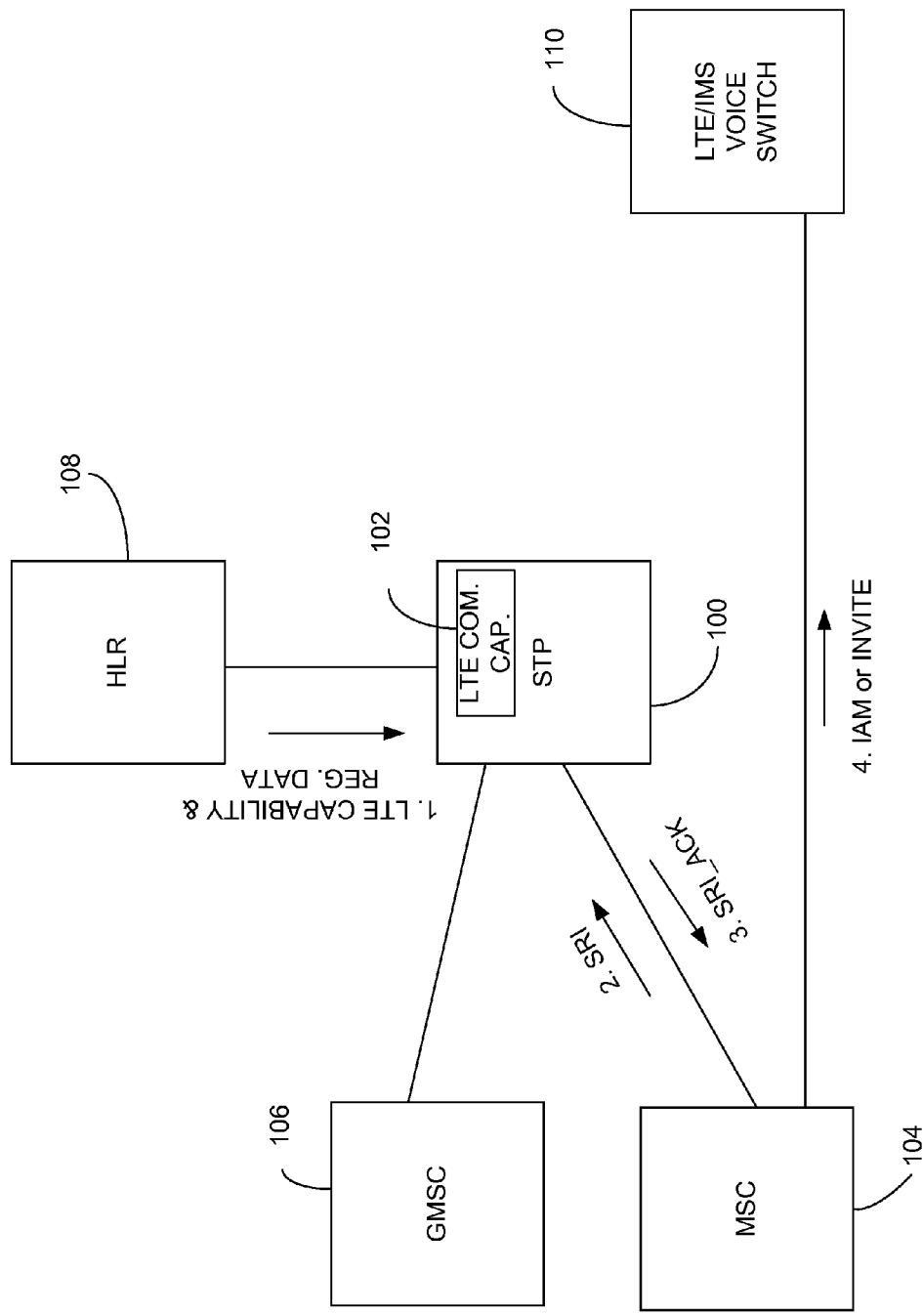
FIG. 3 is a network diagram illustrating another method for provisioning an LTE communication capability database maintained by a signaling message routing node according to an embodiment of the subject matter described herein.

FIG. 3 is a network diagram illustrating an alternate method for provisioning LTE communications database 102. Rather than provisioning the database using a dedicated mobile network operator provisioning system as illustrated in FIG. 2, in FIG. 3, HLR 108 provisions database 102. HLR 108 may store up to date information regarding handset capabilities and current registration status. Accordingly, HLR 108 may be well suited to provision database 102. However, rather than having all queries be processed by HLR 108, placing the LTE communication capability database 102 on routing node 100 may reduce some of the processing burden on HLR 108.

Referring to the message flow illustrated in FIG. 3, in step 1, HLR 108 provisions LTE communication capability data and/or current registration information to LTE communication capability database 102. In an alternate embodiment, LTE communication database 102 may be provisioned by a home subscriber server (HSS). Thus, step 1 would be replaced by the LTE handset capability and registration data coming from an HSS, rather than an HLR. In step 2, MSC 104 sends an SRI message to HLR 108 to determine routing information for a subscriber. In step 3, routing node 100 intercepts the SRI message, determines that the handset is LTE-capable and responds to the SRI message with an SRI_Ack message that contains the address of a node in the LTE network capable of providing LTE service to the handset. In step 4, MSC 104 routes the call to LTE/IMS voice switch 110.

Figure 4:
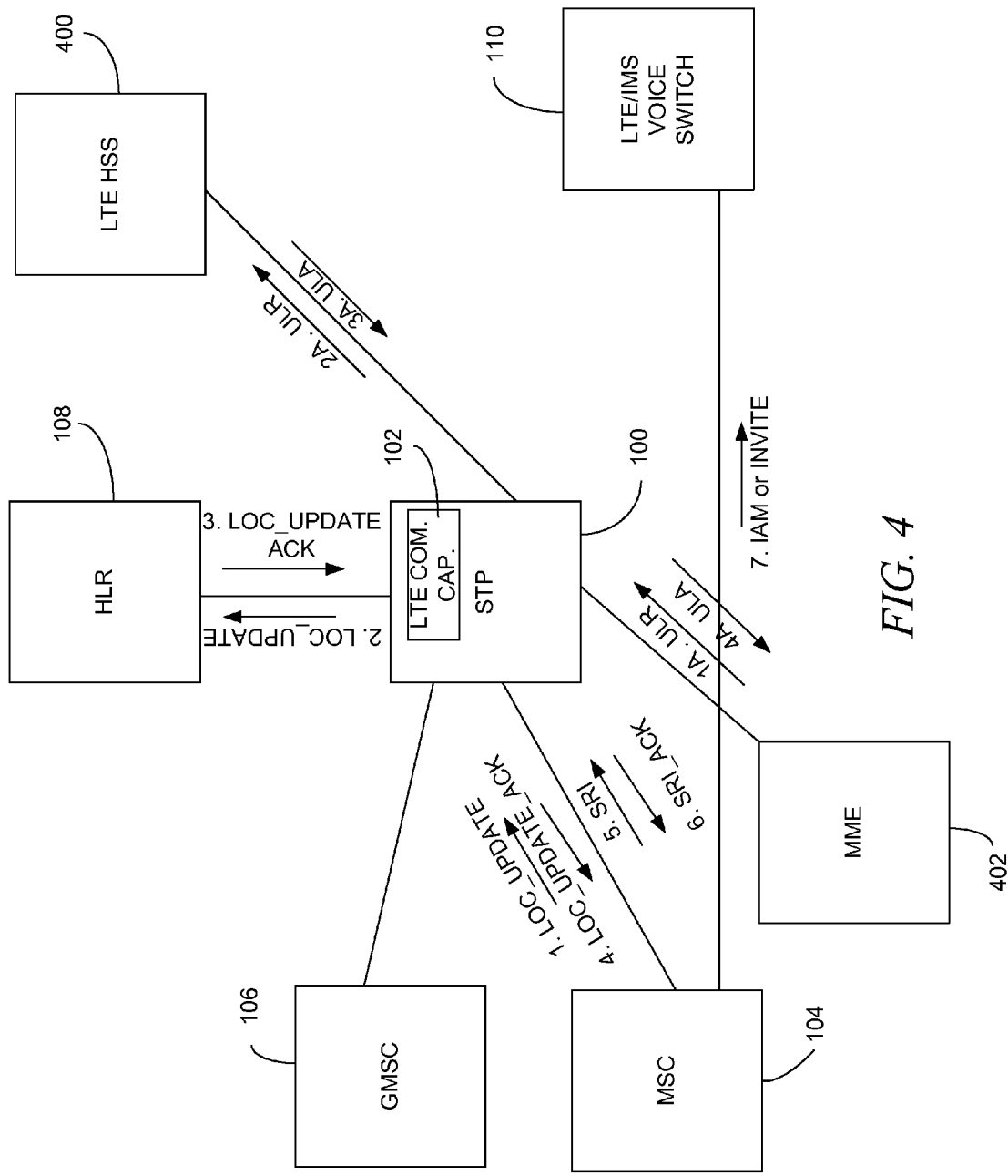
FIG. 4 is a network diagram illustrating an exemplary method for tracking LTE registration status at a signaling message routing node according to an embodiment of the subject matter described herein.

FIG. 4 is a network diagram illustrating a method for provisioning current LTE registration information in LTE communication capability database 102. In FIG. 4, database 102 is dynamically provisioned based on location update or other registration messages received by routing node 100. Referring to the message flow illustrated in FIG. 4, is step 1, MSC 104 sends a location update message to HLR 108 to update a mobile subscriber's location. The location update message may be sent when the subscriber activates his or her phone in a particular area or when the subscriber moves from one area to another area. In step 2, routing node 100 extracts information from the location update message, stores LTE registration and/or capability data in database 102, and routes the location update message to HLR 108. In step 3, HLR 108 sends a location update acknowledgement message to routing node 100, which routes the message to MSC 104 in step 4. In step 5, MSC 104 sends an SRI message to HLR 108 in response to receiving a call directed to a subscriber of the operator's network. Routing node 100 accesses database 102 and determines that the handset corresponding to the B party number in the SRI message is LTE-capable. Accordingly, in step 6, routing node 100 sends an SRI_Ack message to MSC 104. MSC 104 routes the call to LTE LTE/IMS voice switch 110 in step 7.

Figure 5:
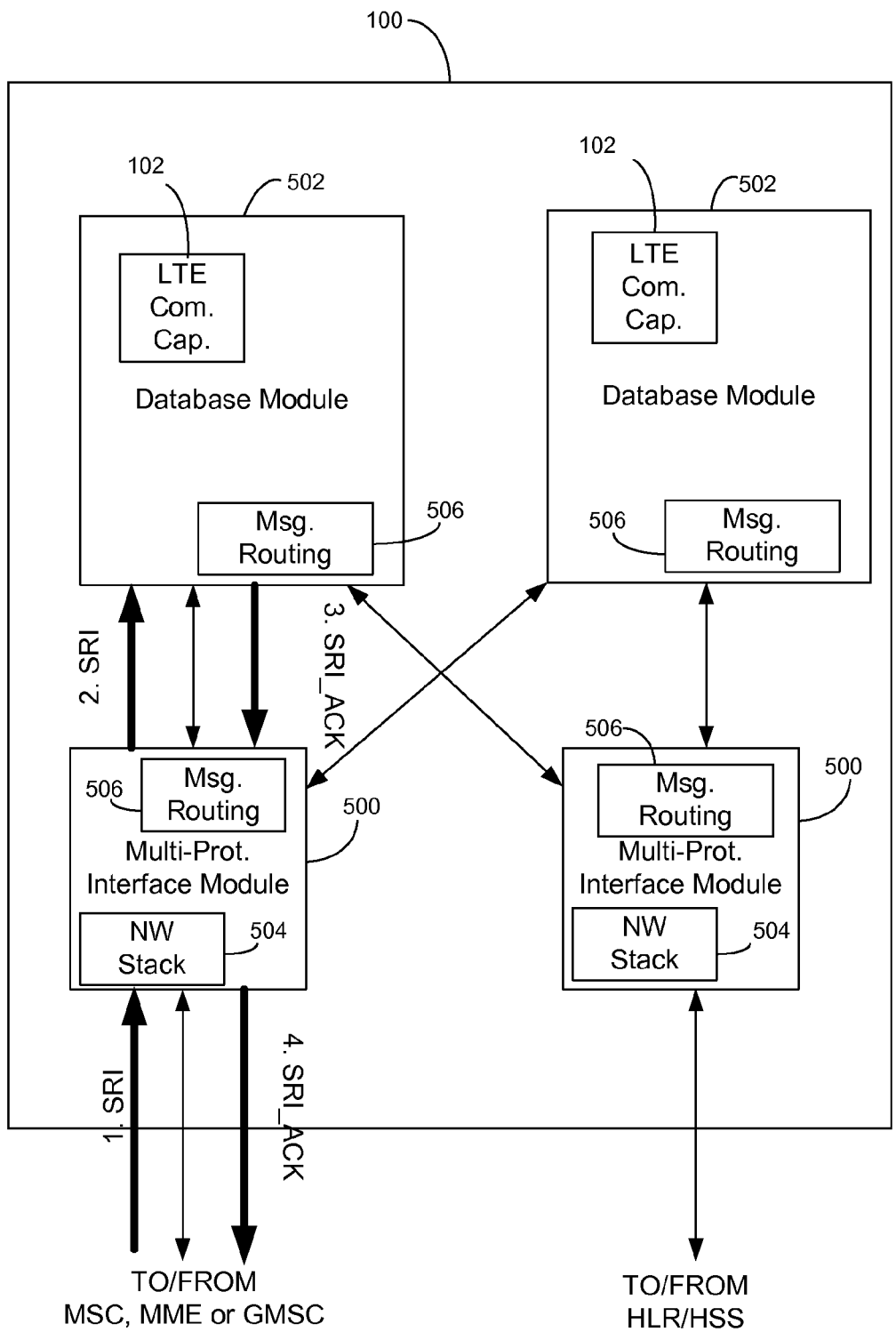
FIG. 5 is a block diagram illustrating an exemplary internal architecture for a signaling message routing node that maintains an LTE communication capability database according to an embodiment of the subject matter described herein.

In addition to provisioning LTE communication database 102 based on 3G location update messages, routing node 100 may provision database 102 based on Diameter update location request (ULR) messages. Referring to the message flow illustrated in FIG. 4, is step 1A, mobility management entity (MME) 400 sends an ULR message to home subscriber server (HSS) 402 to update a mobile subscriber's location. The ULR may be sent when the subscriber activates his or her phone in a particular area or when the subscriber moves from one area to another area. In step 2A, routing node 100 extracts information from the ULR message, stores LTE registration and/or capability data in database 102, and routes the location update message to HSS 402. In step 3A, HSS 402 sends an update location acknowledge (ULA) message to routing node 100, which routes the ULA message to MME 400 in step 4A. FIG. 5 is a block diagram illustrating an exemplary internal architecture and message flow for tracking and communicating LTE communication capability using a database within routing node 100. Referring to FIG. 5, routing node 100 includes multi-protocol interface modules 500 and database modules 502. Multi-protocol interface modules 500 each contain network protocol stacks 504 to communicate with external nodes via a variety of different communications protocols. Exemplary communications protocols that may be implemented by network protocol stacks 504 include SS7 over TDM, SS7 over IP, SS7 over ATM, SIP over IP, SIP over ATM, Diameter over IP, Diameter over ATM, etc. By including IP, ATM, and traditional TDM hardware on the same interface card, multi-protocol interface module 500 can be tailored to a variety of different communications protocols without hardware upgrades.

Database modules 502 each host one or more database applications. In the illustrated example, the database applications include LTE communication capability database applications 102. Each module 500 and 502 also includes a message routing module 506 that routes received messages. Each message routing module 506 may route messages based on SS7 information, IP information, SIP information, Diameter information, or any combination thereof.

Referring to the message flow illustrated in FIG. 5, in step 1, routing node 100 receives an SRI message at multi-protocol interface module 500. Multi-protocol interface module 500 identifies the message as an SRI message and therefore requiring further processing by routing node 100. Accordingly, interface module 500 sends the SRI message to one of database modules 502. One of database modules 502 receives the SRI message, accesses database 102 and determines that the B party number in the SRI message corresponds to a handset that is LTE-capable. Accordingly, in step 3, database module 502 formulates an SRI_Ack message and routes the SRI_Ack message to multi-protocol interface module 500 associated with the originator of the SRI message. In step 4, multi-protocol interface module 500 forwards the SRI_Ack message to the SRI message originator, which in this case is MSC 104.

Figure 6:
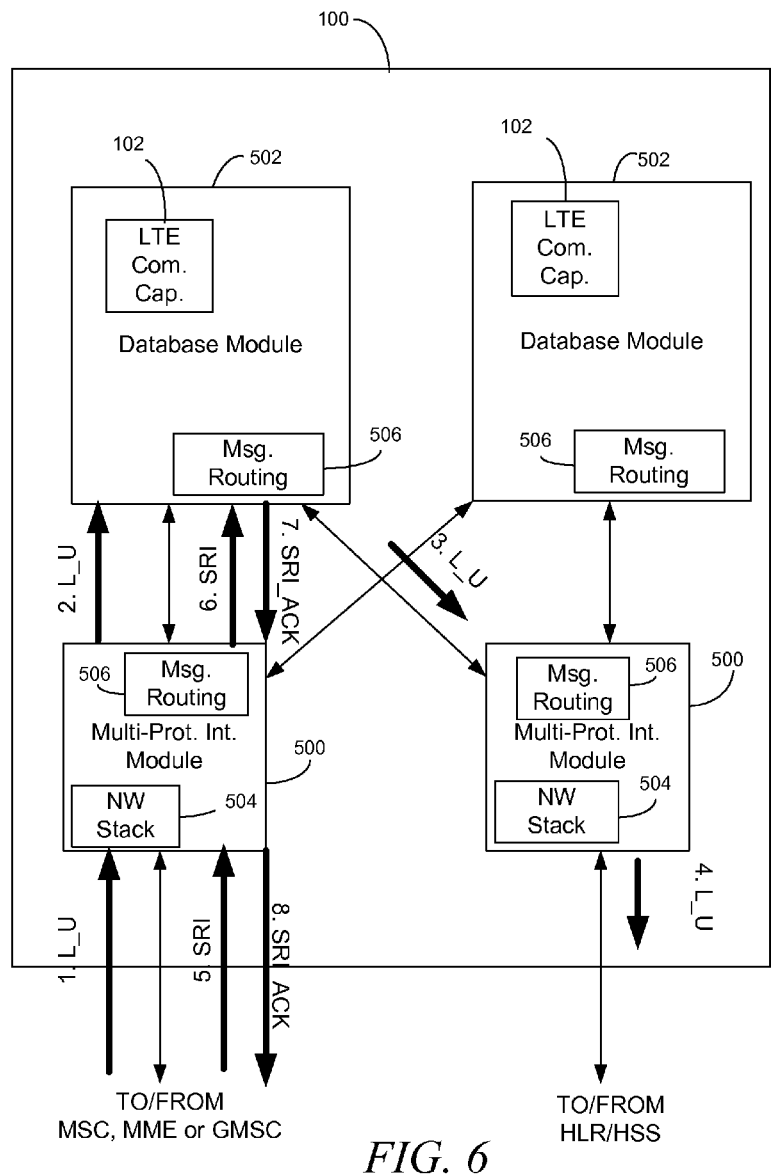
FIG. 6 is a block diagram illustrating an exemplary internal architecture for a signaling message routing node for tracking LTE registration status according to an embodiment of the subject matter described herein.

FIG. 6 is a block diagram illustrating an exemplary internal architecture for routing node 100 where databases 102 are dynamically provisioned based on received registration messages and where the routing node 100 uses this information to respond to requests for routing information for LTE-capable handsets. Referring to the message flow illustrated in FIG. 6, in step 1, multi-protocol interface module 500 receives a location update message. The message could also be a ULR message from MME 400. In step 2, routing node 100 routes the location update message to one of database modules 502, which updates its respective database 102 based on the registration information in the location update message. The receiving database module 502 may periodically synchronize its database 102 with databases 102 hosted by other database modules 502. In step 3, the database module 502 that receives the location update message routes the location update message to the multi-protocol interface module 500 associated with the destination for the location update message. In step 4, the egress multi-protocol interface module 500 forwards the location update message to its destination, which is HLR 108.

If the received message is an ULR message, multi-protocol interface module 500 may forward the message to HSS 400.

In step 5, a multi-protocol interface module 500 receives an SRI message. In step 6, the multi-protocol interface module 500 forwards the SRI message to a database module 502. The receiving database module 502 accesses database 102 to determine whether the B party number and SRI message corresponds to a handset that is LTE-capable. In step 7, the receiving database module formulates an SRI_Ack message indicating an identifier for an LTE-capable node capable for providing LTE service to the B party identified in the SRI message. In step 8, the egress multi-protocol interface module 500 forwards the SRI_Ack message to the originator of the SRI message.

Figure 7:
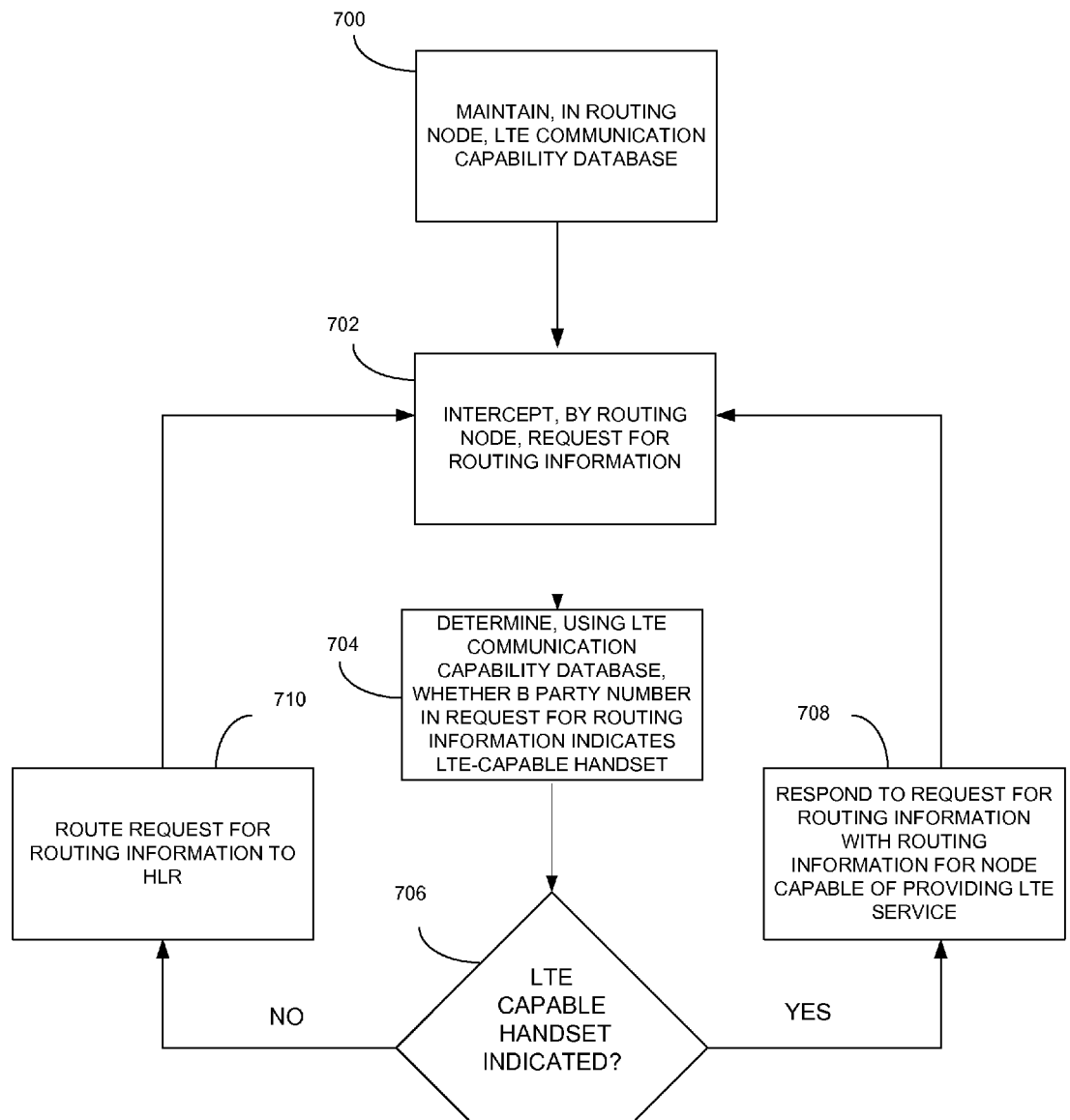
FIG. 7 is a flow chart illustrating exemplary steps for tracking and communicating LTE communication capability according to an embodiment of the subject matter described herein.

FIG. 7 is a flow chart illustrating an exemplary process for communicating and tracking LTE communications capabilities according to an embodiment of the subject matter described herein. Referring to FIG. 7, in step 700, an LTE communication capability database is maintained in a routing node. For example, routing node 100 may maintain LTE communication capability database 102. Database 102 may be statically provisioned or dynamically provisioned. Provisioning may occur using a dedicated provisioning system, using an existing element, such as an HLR, using dynamic provisioning based on received registration messages, or any combination thereof.

In step 702, the routing node intercepts a request for routing information. For example, routing node 100 may intercept an SRI message or other request for routing information concerning mobile subscribers. In step 704, the routing node determines, using the LTE communication capability database, whether the B party number in the request for routing information indicates an LTE-capable handset. For example, routing node 100 may perform a lookup in LTE communication capability database 102 using the B party number to determine whether the B party number corresponds to an LTE-capable handset. In step 706, if an LTE-capable handset is indicated, control proceeds to step 708 where the routing node responds to the request for routing information with routing information for a node capable of providing LTE service. If an LTE-capable handset is not indicated, control proceeds to step 710 where the request for routing information is routed to the HLR. For example, routing node 100 may route the SRI message to HLR 108.

Figure 8:
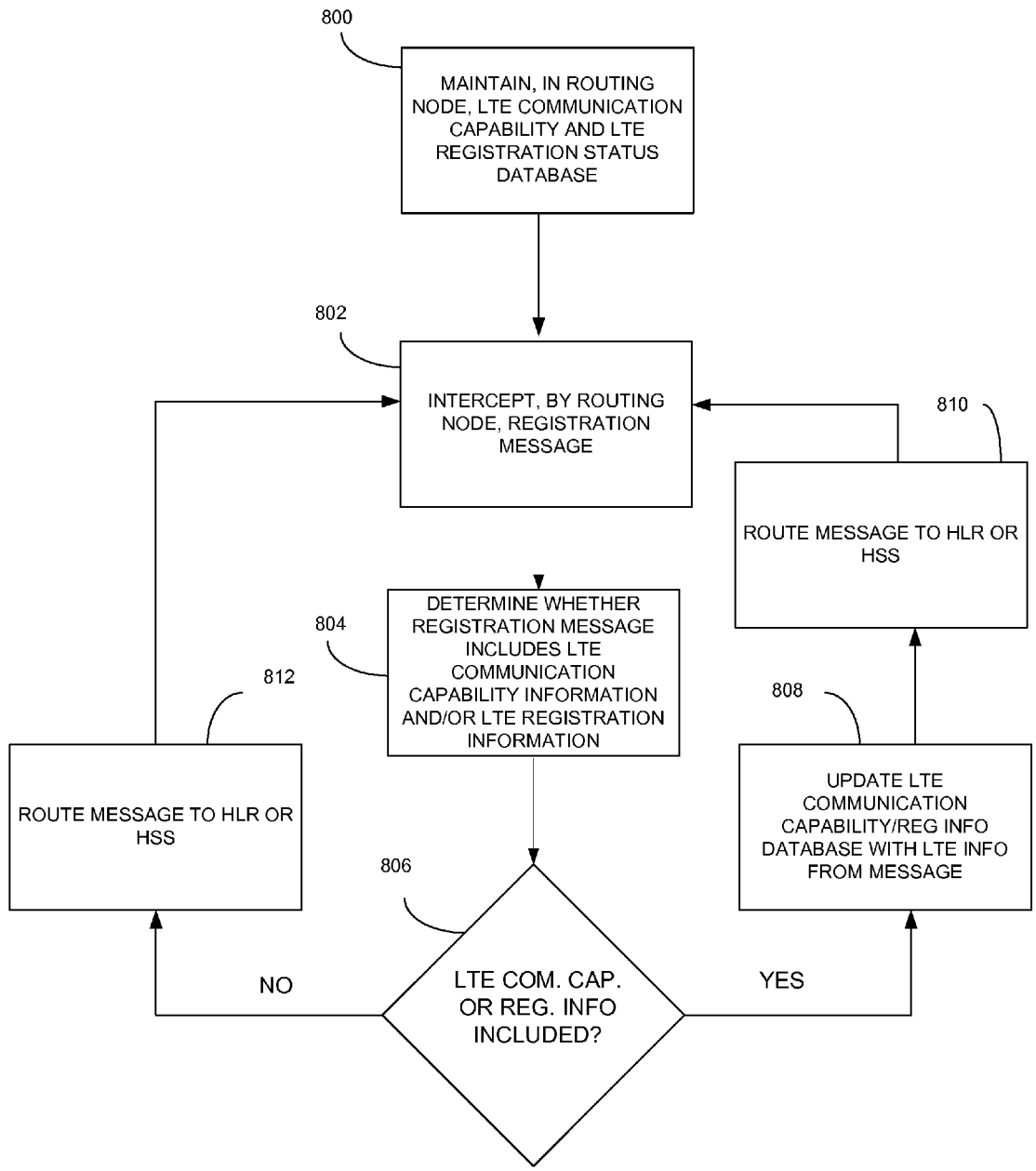
FIG. 8 is a flow chart illustrating an exemplary process for dynamically updating LTE registration information in an LTE communication capability database maintained by a signaling message routing node according to an embodiment of the subject matter described herein.

FIG. 8 is a flow chart illustrating an exemplary process for dynamically updating LTE registration information in an LTE communication capability database maintained by a signaling message routing node according to an embodiment of the subject matter described herein. Referring to FIG. 8, in step 800, the routing node maintains an LTE communication capability database. For example, routing node 100 may include a database that stores information for LTE communication capable handsets. In step 802, the routing node intercepts a registration message. For example, routing node 100 may intercept a location update, a ULR, or other registration message that updates the registration status of a handset. In step 804, the routing node determines whether the message contains LTE communication capability and/or LTE registration information. For example, routing node 100 may determine whether the registration message contains an identifier for an LTE-capable handset and/or information as to whether the handset is currently registered in an LTE network. In step 806, if the registration message contains LTE communication capability and/or LTE registration information, control proceeds to step 808 where routing node 100 updates database 102 with the LTE registration and/or communication capability information for the LTE communication capable handset.

Control then proceeds to step 810 where the message is routed to the HLR or HSS. Returning to step 806, if the message does not contain LTE communication capability and/or LTE registration information, control proceeds to step 812, where the registration message is routed to the HLR or HSS.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for tracking and communicating long term evolution (LTE) handset communication capability, the method comprising:

maintaining, in a signaling message routing node, an LTE communication capability database that stores information indicating LTE communication capable handsets;

intercepting, by the routing node, a request for routing information for a subscriber;

determining, by the routing node, using the LTE communication capability database, whether a B party number in the request for routing information indicates an LTE communication capable handset; and in response to determining that the B party number indicates an LTE communication capable handset, responding, by the routing node, to the request for routing information with an identifier for a node of an LTE network for providing LTE service to the handset.

2. The method of claim 1 wherein the LTE communication capability database is provisioned by a dedicated network operator provisioning system to indicate handsets of the operator's network that are LTE communication capable.

3. The method of claim 1 wherein the LTE communication capability database stores LTE registration status for handsets.

4. The method of claim 3 wherein the LTE communication capability database is provisioned by a home location register (HLR) or a home subscriber server (HSS).

5. The method of claim 3 wherein the LTE communication capability database is dynamically provisioned by the routing node based on received registration messages.

6. The method of claim 1 wherein the LTE communication capability database includes records of subscriber identifiers and indicators of LTE communication capability.

7. The method of claim 1 wherein the LTE communication capability database contains subscriber identifiers for LTE communication capable handsets.

8. The method of claim 1 wherein intercepting the request for routing information includes intercepting a request that is addressed to a home location register (HLR) or a home subscriber server (HSS).

9. The method of claim 8 wherein responding to the request for routing information includes responding on behalf of the HLR.

10. The method of claim 1 wherein the identifier for the node capable of providing LTE services to the handset comprises an identifier for an LTE/IMS voice switch.

11. The method of claim 1 wherein the routing node comprises a signal transfer point (STP).

12. The method of claim 1 wherein the routing node comprises a session initiation protocol (SIP) signaling router.

13. The method of claim 1 wherein the routing node comprises a Diameter signaling router.

14. A system for tracking and communicating long term evolution (LTE) communication capability, the system comprising:

a signaling message routing node including:

an LTE communication capability database for storing identifiers for LTE communication capable handsets; and a database module for receiving a request for routing information for a subscriber, for determining whether a B party number in the request for routing information indicates an LTE capable handset, and, in response to determining that the B party number indicates an LTE capable handset, responding to the request for routing information with an identifier for a node in an LTE network for providing LTE services to the handset.

15. The system of claim 14 wherein the LTE communication capability database is provisioned by a dedicated network operator provisioning system to indicate handsets of the operator's network that are LTE communication capable.

16. The system of claim 14 wherein the LTE communication capability database stores LTE registration status for handsets.

17. The system of claim 16 wherein the LTE communication capability database is provisioned by a home location register (HLR) or a home subscriber server (HSS).

18. The system of claim 16 wherein the LTE communication capability database is dynamically provisioned by the signaling message routing node based on received registration messages.

19. The system of claim 16 wherein the LTE communication capability database includes records of subscriber identifiers and indicators of LTE communication capability.

20. The system of claim 16 wherein the LTE communication capability database contains subscriber identifiers for LTE communication capable handsets.

21. The system of claim 14 wherein intercepting the request for routing information includes intercepting a request that is addressed to a home location register (HLR) or a home subscriber server (HSS).

22. The system of claim 21 wherein responding to the request for routing information includes responding on behalf of the HLR.

23. The system of claim 14 wherein the identifier for the node capable of providing LTE services to the handset comprises an identifier for an LTE/IMS voice switch.

24. The system of claim 14 wherein the routing node comprises a signal transfer point (STP).

25. The system of claim 14 wherein the routing node comprises a session initiation protocol (SIP) signaling router.

26. The system of claim 14 wherein the routing node comprises a Diameter signaling router.

27. A non-transitory computer readable medium having stored thereon computer executable instructions that when executed by the processor of a computer control the computer to perform steps comprising:

maintaining, in a signaling message routing node, a long term evolution (LTE) communication capability database that stores information indicating LTE communication capable handsets;

intercepting, by the routing node, a request for routing information for a subscriber;

determining, by the routing node, using the LTE communication capability database, whether a B party number in the request for routing information indicates an LTE communication capable handset; and in response to determining that the B party number indicates an LTE communication capable handset, responding, by the routing node, to the request for routing information with an identifier for a node of an LTE network for providing LTE service to the handset.

* * * * *